(12) United States Patent
Cunningham

(10) Patent No.: US 7,882,882 B2
(45) Date of Patent: *Feb. 8, 2011

(54) TIRE CHANGING MACHINE

(75) Inventor: Charles L. Cunningham, Nashville, TN (US)

(73) Assignee: Hennessy Industries, Inc., LaVergne, TN (US)

( * ) Notice: Subject to any disclaimer, the term of this patent is extended or adjusted under 35 U.S.C. 154(b) by 140 days.

This patent is subject to a terminal disclaimer.

(21) Appl. No.: 12/075,841

(22) Filed: Mar. 14, 2008

(65) Prior Publication Data

US 2008/0163983 A1 Jul. 10, 2008

Related U.S. Application Data

(63) Continuation of application No. 11/646,168, filed on Dec. 27, 2006, now Pat. No. 7,343,955.

(60) Provisional application No. 60/855,260, filed on Oct. 30, 2006, provisional application No. 60/754,268, filed on Dec. 28, 2005.

(51) Int. Cl.
```
B60C 25/135   (2006.01)
B60C 25/132   (2006.01)
B60C 25/12    (2006.01)
B60C 25/122   (2006.01)
B60C 25/00    (2006.01)
B60C 25/128   (2006.01)
B60B 29/00    (2006.01)
```
(52) U.S. Cl. ............... 157/1.24; 157/1.17; 157/1.2; 157/1.21; 157/1.22; 157/1.39; 157/1.4; 157/1.28; 157/1.26; 414/428

(58) Field of Classification Search ................ 157/1.24, 157/1.17, 1.2, 1.21, 1.22, 1.4, 1.26, 1.28; 414/428
See application file for complete search history.

(56) References Cited

U.S. PATENT DOCUMENTS

| | | | | |
|---|---|---|---|---|
| 3,780,785 | A | * | 12/1973 | Schultz et al. ............ 157/1.24 |
| 3,827,474 | A | * | 8/1974 | Besuden .................... 157/1.28 |
| 4,209,053 | A | | 6/1980 | du Quesne |
| 4,245,686 | A | | 1/1981 | Holladay |
| D269,879 | S | | 7/1983 | Holladay et al. |
| 4,417,614 | A | | 11/1983 | Cunningham et al. |
| D293,916 | S | | 1/1988 | Cunningham et al. |
| 4,811,774 | A | * | 3/1989 | Dale et al. ................. 157/1.1 |
| 4,960,034 | A | | 10/1990 | Corghi |
| 5,219,012 | A | * | 6/1993 | Corghi ....................... 157/19 |
| 5,244,029 | A | | 9/1993 | Schoen et al. |
| 5,458,177 | A | | 10/1995 | Magnani |

(Continued)

OTHER PUBLICATIONS

Pending U.S. application entitled "Lift Mechanism for Tire Changing Machine," U.S. Appl. No. 11/966,401, filed Dec. 28, 2007.

(Continued)

*Primary Examiner*—Bryan R Muller
(74) *Attorney, Agent, or Firm*—Nelson Mullins Riley & Scarborough LLP

(57) ABSTRACT

A tire changing machine for changing difficult to mount tires is provided. The machine utilizes various implements configured about the machine's chassis in such a way that they do not interfere with each other's operation. In this way, the machine enables an operator to effectively change various tires.

14 Claims, 10 Drawing Sheets

U.S. PATENT DOCUMENTS

| | | |
|---|---|---|
| 5,490,552 A | 2/1996 | Vignoli |
| 5,623,981 A | 4/1997 | Cunningham et al. |
| 5,669,429 A | 9/1997 | Gonzaga |
| 5,752,555 A | 5/1998 | Cunningham et al. |
| 5,836,368 A | 11/1998 | Corghi |
| 5,941,294 A | 8/1999 | Cunningham et al. |
| 6,056,034 A | 5/2000 | Matnick |
| 6,109,327 A | 8/2000 | Gonzaga |
| 6,173,751 B1 | 1/2001 | Magnani |
| 6,182,736 B1 * | 2/2001 | Cunningham et al. ...... 157/1.24 |
| 6,192,959 B1 | 2/2001 | Spaggiari |
| 6,227,277 B1 | 5/2001 | Corghi |
| 6,240,995 B1 * | 6/2001 | Corghi ...................... 157/1.22 |
| 6,257,299 B1 | 7/2001 | Toriselli |
| 6,276,422 B1 | 8/2001 | Rino |
| 6,408,921 B1 * | 6/2002 | Bonacini ................... 157/1.24 |
| 6,422,285 B1 | 7/2002 | Gonzaga |
| 6,443,206 B1 * | 9/2002 | Bonacini ................... 157/1.24 |
| 6,527,032 B2 | 3/2003 | Corghi |
| 6,588,478 B2 | 7/2003 | Vignoli |
| 6,761,061 B2 | 7/2004 | Corghi |
| 7,089,987 B2 * | 8/2006 | Gonzaga ...................... 157/14 |
| 7,343,955 B2 * | 3/2008 | Cunningham .............. 157/1.24 |
| 7,438,109 B2 * | 10/2008 | Cunningham .............. 157/1.24 |
| 2002/0154983 A1 * | 10/2002 | Corghi ....................... 414/680 |
| 2002/0164238 A1 | 11/2002 | Ferrari et al. |
| 2003/0084977 A1 | 5/2003 | Gonzaga |
| 2003/0131947 A1 | 7/2003 | Magnani |
| 2003/0150565 A1 | 8/2003 | Gonzaga |
| 2003/0217816 A1 | 11/2003 | Gonzaga |
| 2003/0221791 A1 * | 12/2003 | Gonzaga ................... 157/1.28 |
| 2004/0055712 A1 | 3/2004 | Corghi |
| 2004/0182520 A1 | 9/2004 | Spaggiari |
| 2004/0221964 A1 * | 11/2004 | Bonacini ................... 157/1.28 |
| 2007/0158033 A1 * | 7/2007 | Cunningham .............. 157/1.17 |

OTHER PUBLICATIONS

Pending U.S. application entitled "Tire Changer," U.S. Appl. No. 11/647,527, filed Dec. 28, 2006.

* cited by examiner

TIRE CHANGING MACHINE

CROSS-REFERENCE TO RELATED APPLICATIONS

This application is a continuation of application Ser. No. 11/646,168, filed Dec. 27, 2006, now U.S. Pat. No. 7,343,955, which claims the benefit of provisional application Ser. No. 60/855,260, filed Oct. 30, 2006, and provisional application Ser. No. 60/754,268, filed Dec. 28, 2005. These applications to which Applicant claims priority are relied upon and incorporated herein by reference in their entirety.

BACKGROUND OF THE INVENTION

The present invention relates to tire changers and processes used in the changing of tires. More particularly, the present invention relates to an improved tire changing machine incorporating features to assist an operator in changing a tire.

Those of skill in the art of designing and manufacturing equipment used to change tires mounted on the rims of cars, light trucks, and other vehicles will appreciate that many prior art tire changing machines exist. For example, a rim holding tire changer is disclosed in U.S. Pat. No. 6,182,736 to Cunningham et al., the disclosure of which is incorporated herein by reference.

The typical tire-changing procedure involves the following steps: (1) loosening the seal between the tire's bead and the rim, (2) placing the tire-rim assembly on a rotatable table of a tire changer, (3) securing the rim to the table, (4) removing the tire from the rim using a mount/dismount head, (5) placing a new tire over the rim, (6) mounting the tire on the rim using the mount/dismount head to force the bead over the rim, and (7) filling the air chamber of the tire with air to inflate the new tire.

The design of wheel and tire configurations constantly changes for many reasons, including improved durability and performance. Recent innovations in tire design have resulted in wider, lower profile tires with stiffer sidewalls. One such tire is referred to as a "run-flat" tire, which is designed to maintain its shape for a specified period of time after having been punctured. The characteristics of these tires that make them more durable also make them much more difficult to change due to their increased tread width and decreased flexibility. Furthermore, the operator must apply a greater force to disengage the tire bead from the rim. These and other considerations are taken into account during the development and design of more effective and efficient tire changers.

SUMMARY OF THE INVENTION

The present invention recognizes and addresses considerations of prior art constructions and methods and provides a tire changing machine with multiple tools to aid an operator in removing and installing a tire.

According to one aspect, the present invention provides a tire changing machine having a plurality of implements arranged about the machine's chassis. As will be described in more detail below, the machine includes a chassis having a front and a back, and a rotatable turntable. The turntable is designed to retain a wheel rim.

A lift mechanism may be located adjacent to the chassis (e.g., in the front) to assist in raising and lowering potentially heavy tires and tire-rim assemblies onto the turntable. A mount/demount head is attached to a tower, preferably a tiltable tower. The tower is located adjacent to the chassis such that the mount/demount head is positionable near the vehicle rim. A helper arm assembly may be located near the back of the chassis.

A horizontal roller assembly provided with at least one roller is also preferably located near the back of the chassis. In addition, a plurality of actuators are attached to the chassis. The actuators are configured to control the movement of the tiltable tower and the movement of the turntable. In a preferred embodiment, the tiltable tower tilts toward the turntable from a position diagonally across the chassis from the actuators.

Other objects, features and aspects of the present invention are discussed in greater detail below.

BRIEF DESCRIPTION OF THE DRAWINGS

The accompanying drawings, incorporated in and constituting part of this specification, illustrate one or more embodiments of the invention and, together with the description, serve to explain the principles of the invention.

Figure 1:
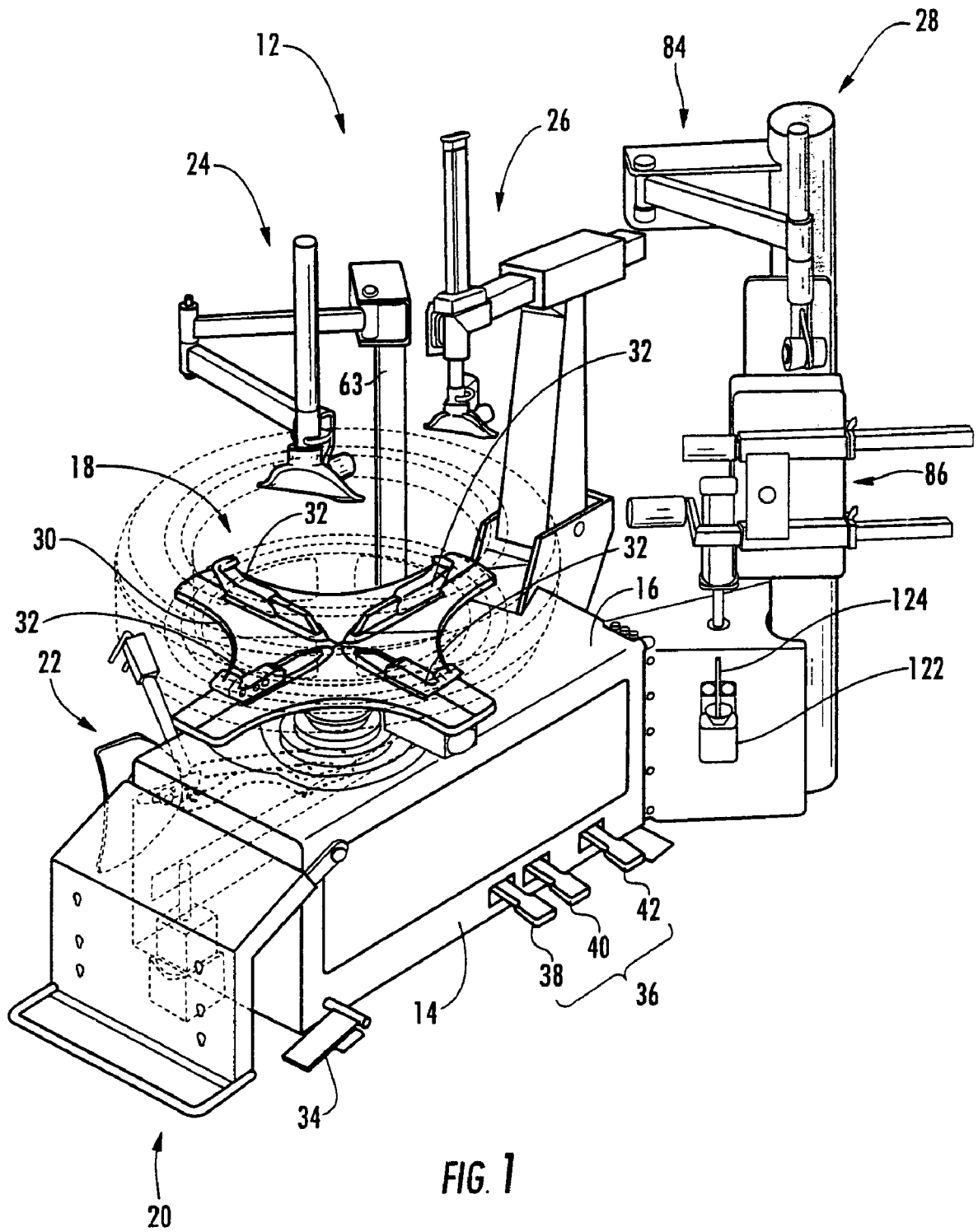
FIG. 1 is a perspective view of a tire changing machine in accordance with an embodiment of the present invention.

Repeat use of reference characters in the present specification and drawings is intended to represent same or analogous features or elements of the invention.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Referring first to FIG. 1, a perspective view of an embodiment of a tire changing machine 12 in accordance with the present invention is shown. In the illustrated embodiment, machine 12 is designed to work on rims of up to about thirty inches in diameter. A chassis 14 is located among a number of implements designed to assist an operator in mounting and demounting tires from rims. These implements include a turntable 18 situated above a chassis top 16, a lift mechanism 20 located in this case at the front of chassis 14, a bead loosening assembly 22, a helper arm assembly 24, a mount/demount assembly 26, and a tower 28. The subparts and functions of each of these implements will be discussed separately below.

Continuing to refer to FIG. 1, turntable 18 will be described in greater detail. In this case, turntable 18 includes a tabletop 30 that has four radial protrusions onto which slidable clamps 32 are mounted. Preferably, clamps 32 are pneumatically actuated, moving radially inward and outward atop tabletop 30. The tips of clamps 32 are configured to fit between the tire and rim of a tire-rim assembly (shown in phantom). As a result, the rim will be securely retained to tabletop 30 for rotation therewith. Although clamps 32 are pneumatically actuated in this embodiment, other suitable methods of positioning the clamps are contemplated by the present invention. In fact, other types of turntables known in the art could also be employed to retain a tire-wheel assembly. For example, some embodiments of the present invention may utilize a "tea cup" turntable.

Figure 8:
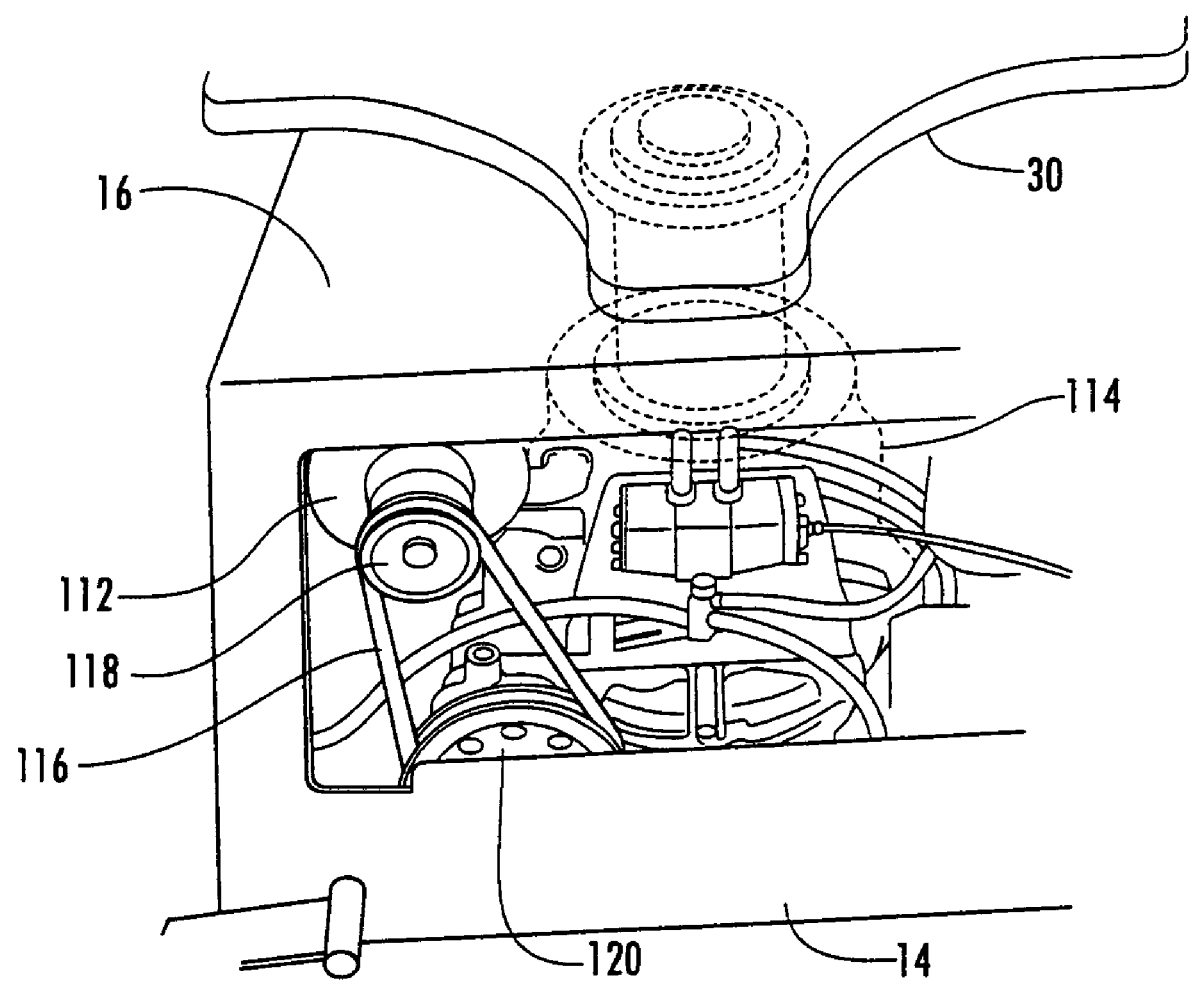
FIG. 8 is a side view of the base of the tire changing machine shown in FIG. 1 with a side panel of the housing removed to show certain internal components.

In addition to retaining a tire-rim assembly, turntable 18, along with a motor and transmission within chassis 14 (as shown in FIG. 8), rotates relative to chassis top 16 to assist in the mounting/demounting of a tire from a rim. Both the movement of clamps 32 and the rotation of tabletop 30 are actuated by pedals 36. In the embodiment shown in FIG. 1, pedal 38 controls clamps 32, pedal 40 controls rotation of tabletop 30, and pedal 42 controls the tilting of mount/demount assembly 26.

Figure 2:
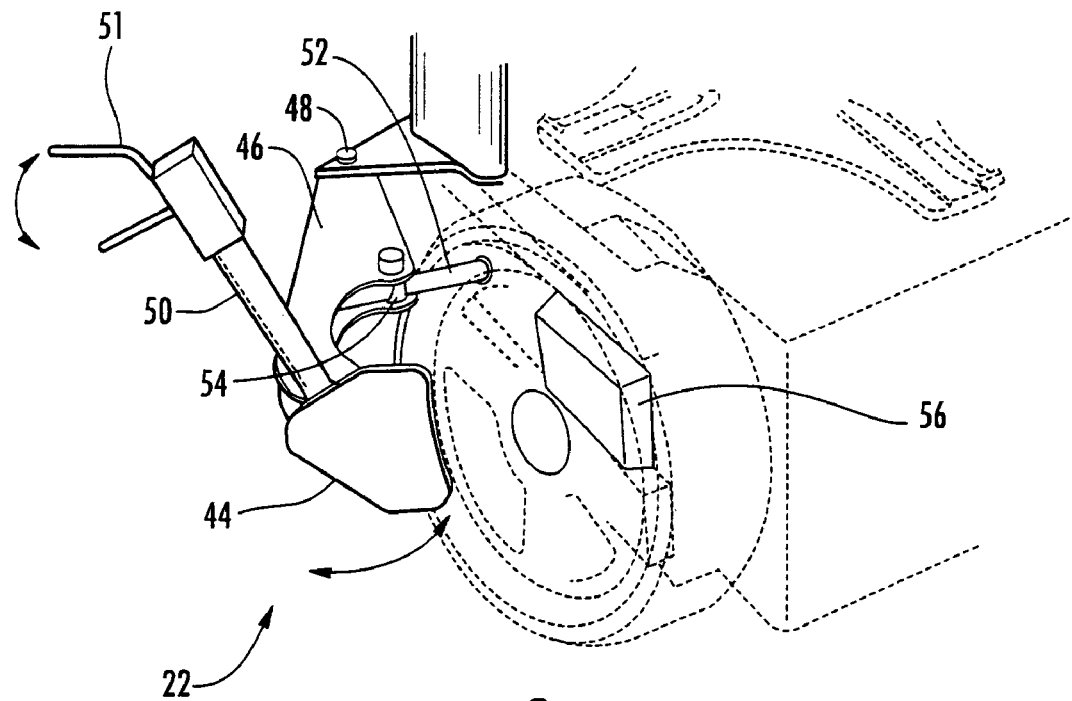
FIG. 2 is a perspective view of the left side of the tire changing machine of FIG. 1.

Referring now to FIG. 2, bead loosening assembly 22 will be described in more detail. Bead loosening assembly 22 includes a hinged member 46 pivotally connected to chassis 14 at hinge 48. A loosener blade 44 is connected to the distal end of hinged member 46, as shown. The operator holds a handle 50 and positions blade 44 near the tire-rim interface when loosening a tire bead. To position blade 44 and apply the pressure necessary to loosen the tire bead from the rim, a pneumatically-assisted shaft 52 is connected to hinged member 46 at location 54. The translational motion of shaft 52 pivots hinged member 46 and blade 44 so as to loosen the tire bead from the rim.

Lever 51 controls the pneumatic operation of blade 44. That is, pushing lever 51 toward chassis 14 opens a valve, thereby pneumatically moving blade 44 in one direction. Pushing lever 51 in the opposite direction pneumatically moves the blade in the opposite direction. The opposite side of the wheel rim engages a pad 56 mounted to the side of chassis 14 to help prevent scratches or other markings on the rim. Those of skill in the art will realize that several different configurations of bead loosening assemblies could be utilized, including assemblies that are not pneumatically-assisted or that incorporate different hinge points or no hinges at all.

The novel bead loosening system of the present invention utilizes a three position, four way valve controlled by lever 51 such that an overstroke arm mechanism is not needed. With this system, blade 44 moves only as much as required, which reduces the wait time that was characteristic of prior art devices. In addition, by removing the overstroke mechanism, the blade can power out of situations where the blade is lodged between the tire and the rim.

Figure 3:
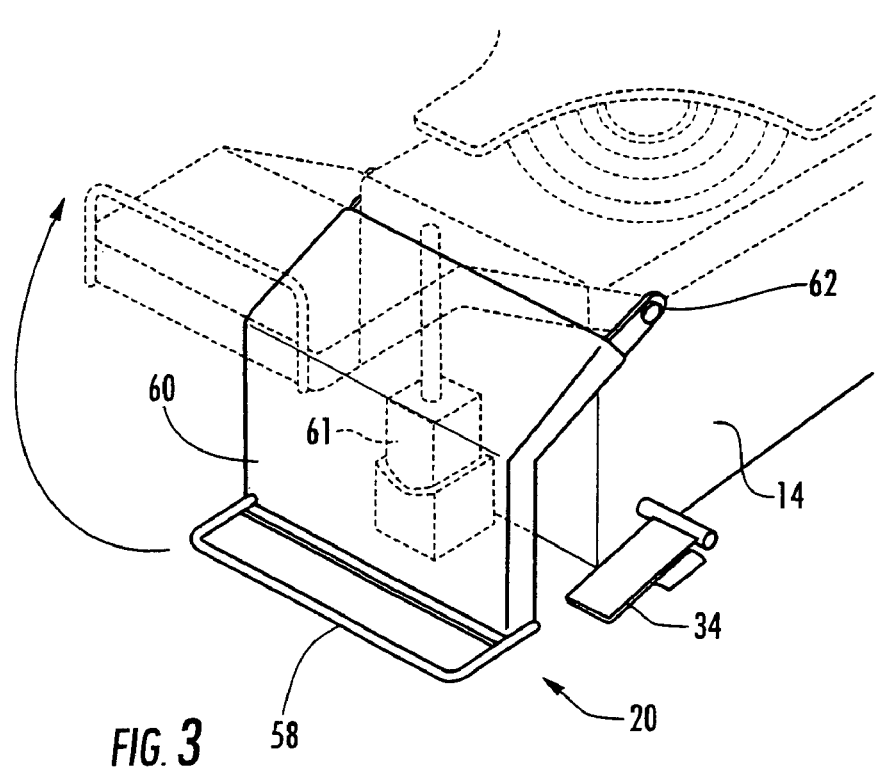
FIG. 3 is a perspective view of a lift mechanism attached to the front of the tire changing machine of FIG. 1.

Referring to FIG. 3, lift mechanism 20 is provided in this embodiment for assisting the operator in raising and lowering tires and wheels. As shown, bar 58 extends transversely from the distal end of the angled lift arm 60 to retain the tire as it is raised and lowered. Lift arm 60 is hinged to chassis 14 at a pair of pivot points 62 located on respective sides of the chassis near chassis top 16. A pneumatic actuator 61 (shown in phantom) is used to raise and lower the lift mechanism. Other lifting actuators, such as electric or hydraulic actuators, could also be used throughout machine 12, but pneumatic actuation is often preferred due to the relative ease of access to a compressed air source in most workshop locations. Pedal 34 is provided to control operation of the lift mechanism.

Conventionally, lift mechanisms have been associated with rim holding or center post tire changers. In the prior art, however, these have been devices with parallelogram or scissor type mechanisms that lift or raise the tire parallel as they move upward. In contrast, the pivoting lift mechanism of the present invention permits an operator to place and balance the tire on the bar at the leading edge of the lift mechanism for its lift feature.

Figure 9:
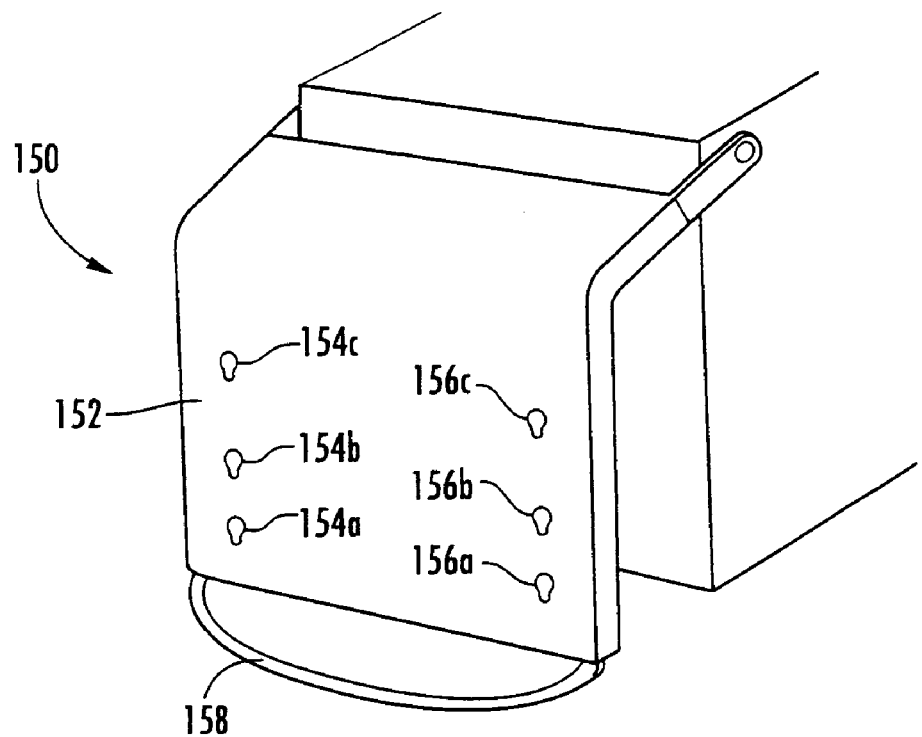
FIG. 9 is a perspective view of an alternative embodiment of a lift mechanism in accordance with the present invention.

In addition, the tire can be placed between the lift and a rim on the machine to ovalate the tire for various purposes (e.g., for facilitating repairs or to aid in the removal or installation of the support member inside a PAX system tire). This can be explained with reference to FIG. 9, where an alternative embodiment of the lift mechanism is illustrated. Left mechanism 150 is similar to lift mechanism 20, except that lift arm 152 defines a series of parallel holes 154*a-c* and 156*a-c*. Holes 154*a-c* and 156*a-c* are each formed having a larger portion from which a smaller slotted portion depends. The larger portion is sized to allow the head of a bracket knob to pass through, while the smaller portion receives the shank of the bracket knob but will not allow the head to pass. A bar 158 (which has a round cross section in this embodiment) is located at the leading edge of lift arm 152 as shown.

Figure 10:
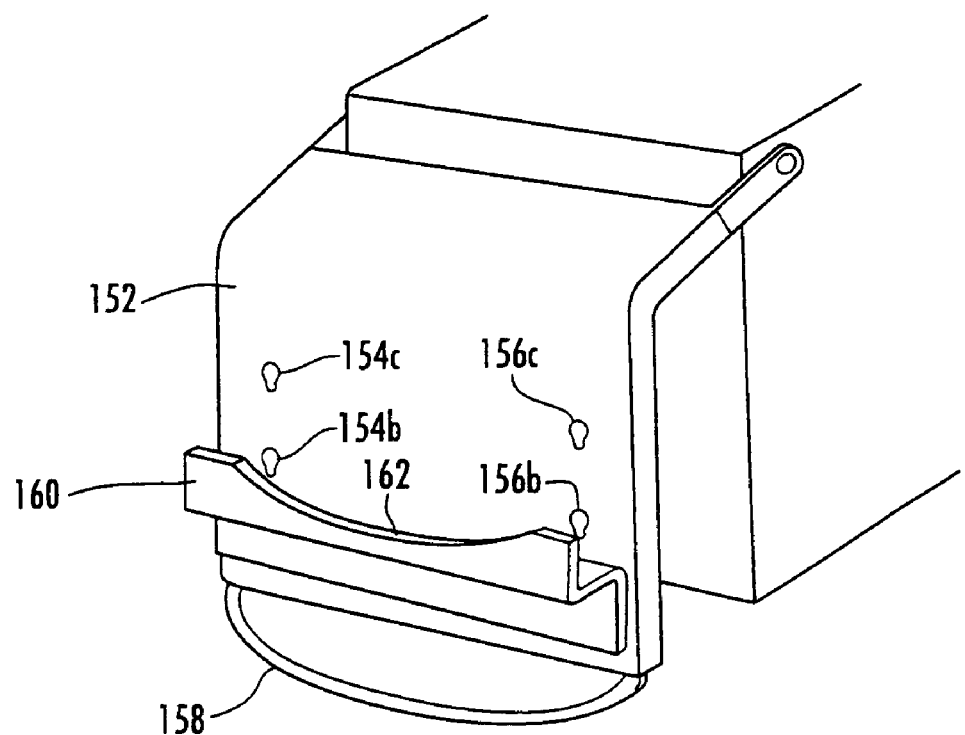
FIG. 10 illustrates the lift mechanism of FIG. 9 with bracket attached.

Holes 154*a-c* and 156*a-c* thus permit the attachment of a removable bracket 160 (FIG. 10) for facilitating ovalation of the tire (i.e., temporarily forcing the tire into an oval shape). The series of holes 154*a-c* and 156*a-c* allow the attachment location of the bracket to be adjusted to accommodate various diameter tires. The leading edge 162 of bracket 160 is preferably configured to facilitate receipt of the tire diameter. In this case, for example, leading edge 160 defines an arc on which a tread portion of the tire is engaged. In addition, leading edge 162 can be stepped or interrupted to assure a good "grip" on the tire.

Figure 11:
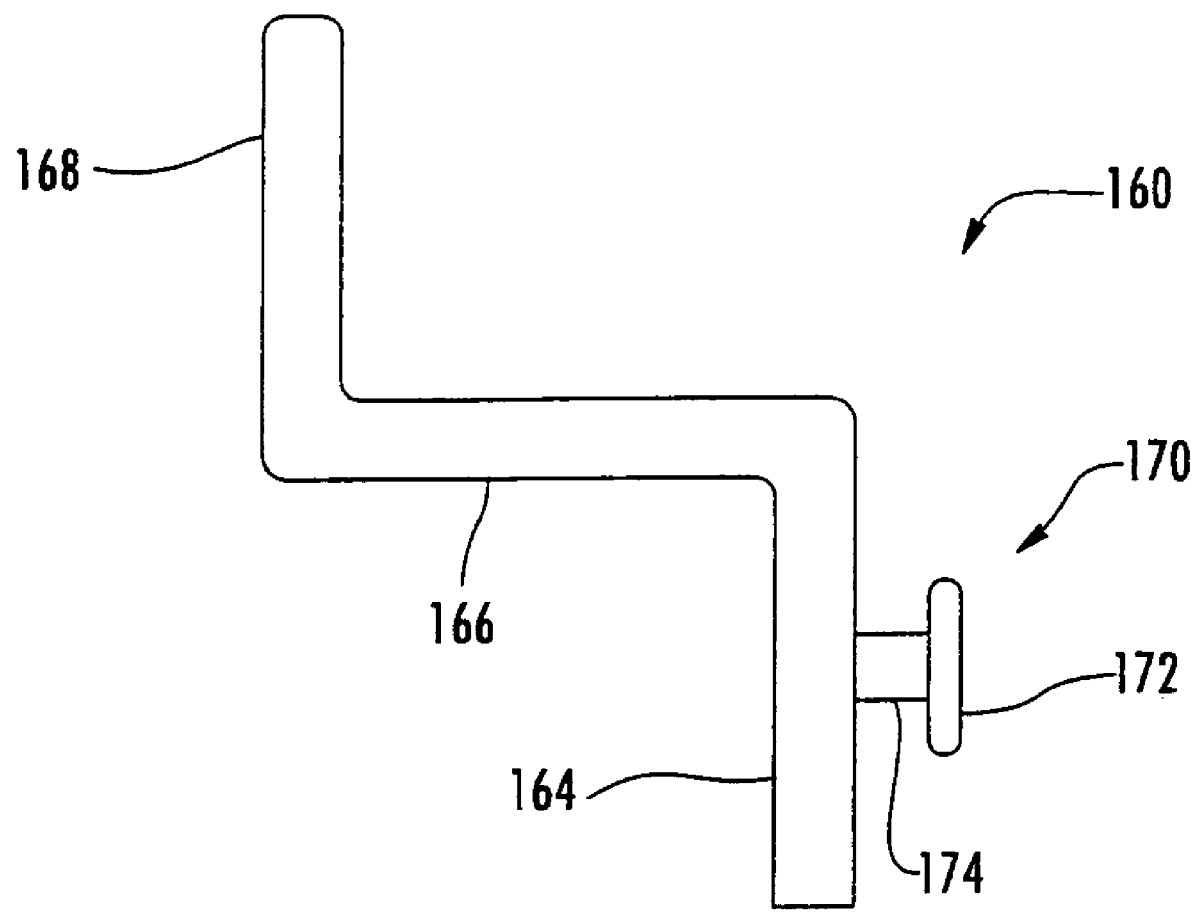
FIG. 11 is a side elevation of a preferred bracket that may be attached to the lift mechanism of FIG. 9.

A side view of bracket 160 is illustrated in FIG. 11. In this case, bracket 160 is configured as a "zee" bracket having base portion 164, intermediate portion 166 and leading portion 168. Base portion 164 includes a pair of parallel knobs (such as knob 170) for receipt in corresponding holes 154*a-c* and 156*a-c*. As shown, knob 170 has a head portion 172 and a smaller shank 174.

Figure 4:
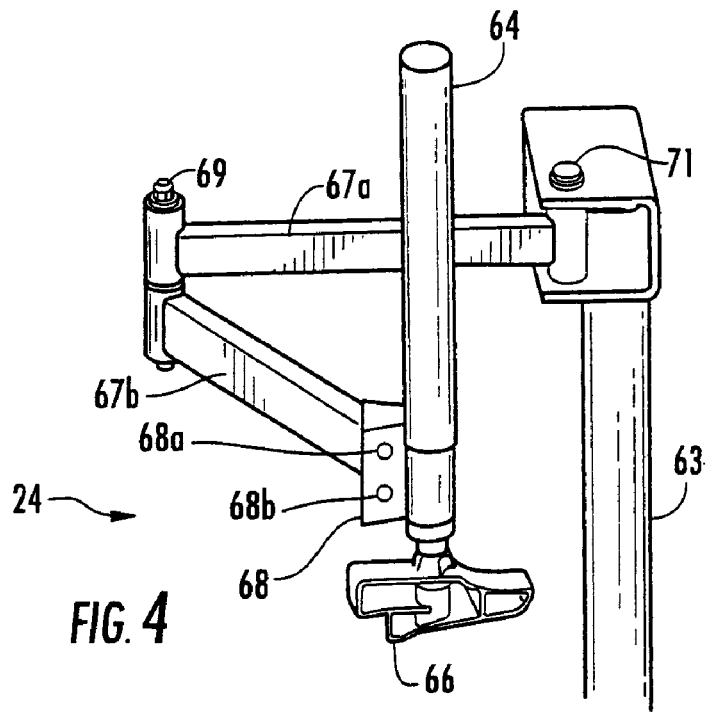
FIG. 4 is a perspective view of a helper arm assembly of the tire changing machine in FIG. 1.

Referring now to FIG. 4, helper arm assembly 24 functions to create bead lock and provide leverage on run-flat and low profile tires. In the illustrated embodiment, helper arm assembly 24 includes a support post 63 attached to chassis 14. In other embodiments, however, assembly 24 may be a separate, portable assembly having its own base and capable of being independently positioned relative to machine 12.

Assembly 24 includes a cylinder 64 having a piston rod to which contact block 66 is mounted. As a result, contact block 66 can be rotated to a desired orientation. A controller 68 includes up and down buttons 68a and 68b so that an operator can move or adjust contact block 66 vertically. A pair of arm segments 67a and 67b are articulated at an intermediate pivot point 69. The proximal end of arm segment 67a is pivotally connected to support post 63 at pivot point 71. U.S. Pat. No. 6,182,736 includes a detailed description of a tire changing machine incorporating a helper arm assembly of this type.

Figure 5:
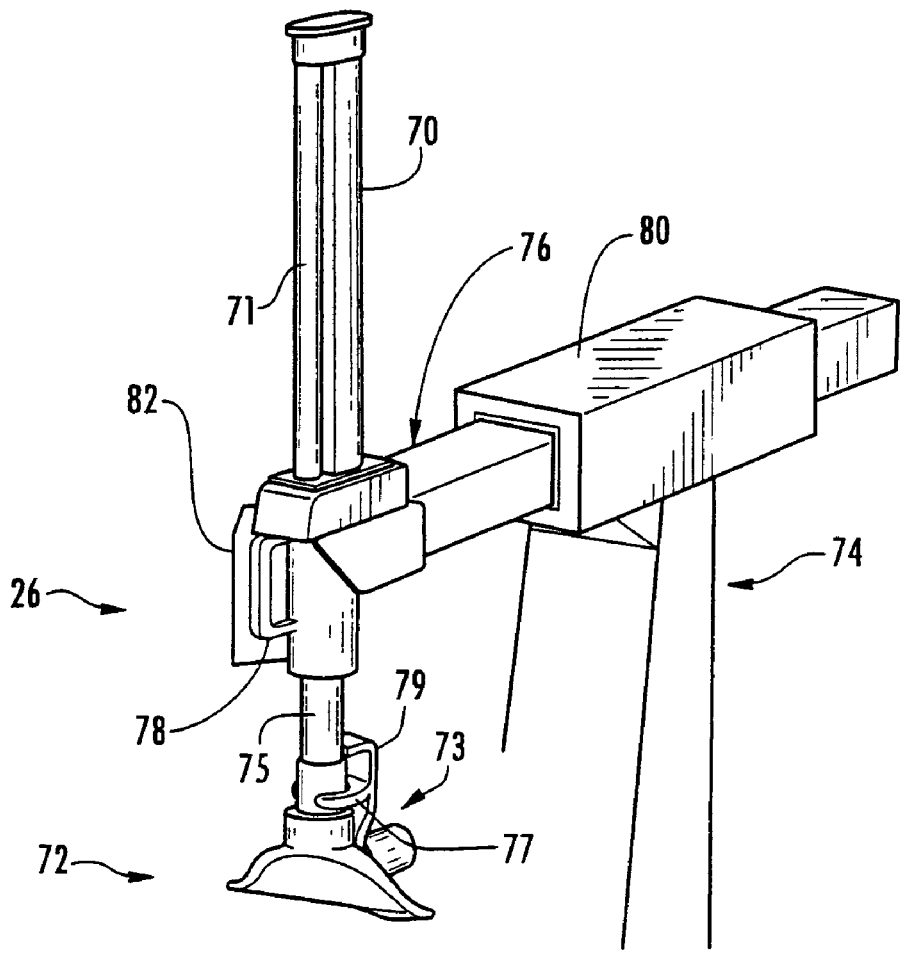
FIG. 5 is a perspective view of a mount/demount assembly of the tire changing machine in FIG. 1.

Referring now to FIG. 5, mount/demount assembly 26 will be described in greater detail. Mount/demount assembly 26 includes a post 70 onto which a mount/demount head 72 is mounted. An air cylinder 71 is attached to post 70 and arm 76, which is in turn connected to a tiltable tower 74. Filling air cylinder 71 will raise head 72, while venting cylinder 71 to atmosphere allows head 72 to move downward by gravity.

Tiltable tower 74 is capable of tilting radially away from chassis top 16. That is, tower 74 controls whether head 72 is proximate the tire-rim assembly during installation/removal or tilted back and away from the tire-rim assembly when other operations are being performed. It will be noted, however, that tower 74 tilts toward and away from the turntable along a radial plane angularly offset from a back-to-front axis of said chassis extending transverse and through a rotational axis of the turntable. As such, the tilting feature of tower 74 enables the operator to more easily configure the various tools (such as lift mechanism 20, bead loosening assembly 22, helper arm assembly 24, and tower 28) about the wheel when head 72 is not needed.

Continuing to refer to FIG. 5, a handle 78 is provided to aid in the positioning of mount/demount head 72. This positioning is possible because arm 76 is capable of sliding within a tube 80 located at the top of tiltable tower 74. A controller 82 enables the operator to control the vertical movement of head 72 by pressurizing cylinder 71. However, other suitable methods of effecting the vertical movement of head 72 are contemplated by the present invention.

In presently preferred embodiments, the tilt cylinder is operatively interconnected with the locking mechanism which locks arm 76 in the desired horizontal position. In particular, a shuttle valve is preferably employed to engage the locking mechanism as tiltable tower 74 is tilted back. This ensures that arm 76 and the attached mount/demount head do not slide back undesirably during tilting. The locking mechanism stays engaged as long as tiltable tower 74 is in the tilted position. The valve may have exhaust flow control to limit exhaust as tiltable tower 74 is tilted forward. Such an arrangement limits exhaust so that the locking mechanism is released slowly as tiltable tower 74 is brought forward.

A finger roller 73 is located at the mount/demount assembly to assist in keeping the tire bead in location under the mount/demount head's knob when mounting a tire. Although roller devices have been used in the past to press down on a tire's sidewall and keep the bead under the knob, these devices have suffered from inadequate size or a lack of removeability. Finger roller 73 is removeably attached to a shaft 75 just above head 72, and thus does not require the operator to force downward on the roller. The location of roller 73 and the attachment point assures the correct location—just in front of the mount/demount head's knob. When not in use, finger roller 73 can be stored in a convenient location on the machine, within the operator's reach.

In the embodiment shown in FIG. 5, roller 73 has a U-shaped fixture 77 at one end that slides into flat grooves defined on either side of shaft 75. This U-shaped configuration secures roller 73 laterally, while an extension piece 79 helps secure roller 73 vertically. Thus, the method of mounting roller 73 to shaft 75 allows removeability of roller 73 while providing a connection that exerts force upon the tire bead during tire mounting.

Figure 6:
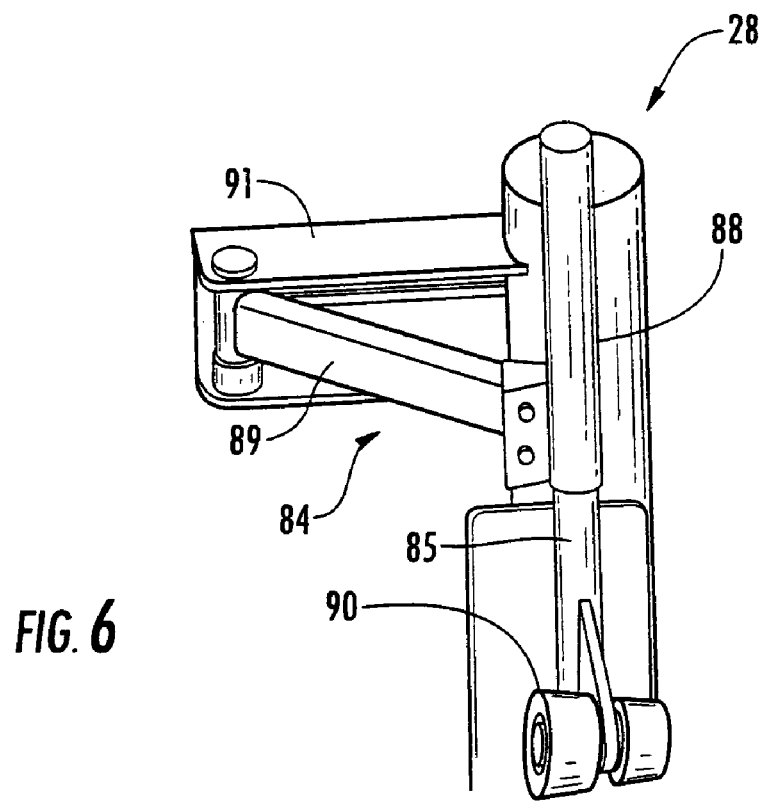
FIG. 6 is a perspective view of a roller arm assembly of the tire changing machine in FIG. 1.
Figure 7:
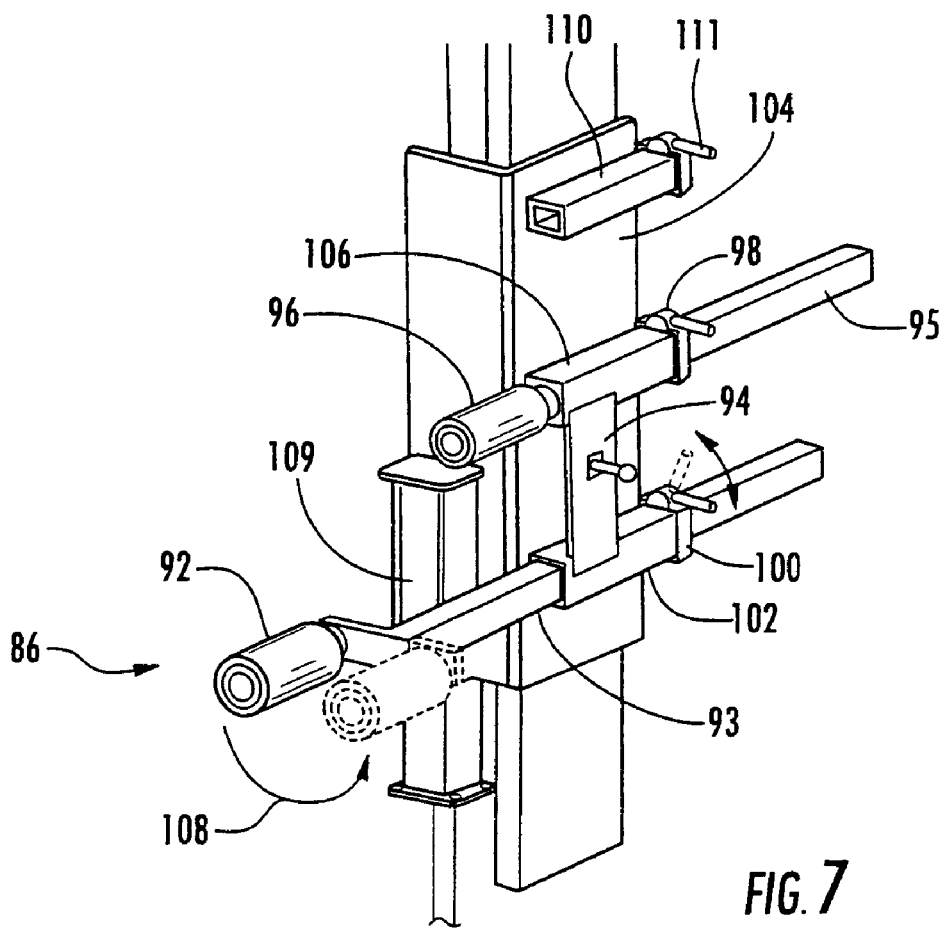
FIG. 7 is a perspective view of a horizontal roller assembly of the tire changing machine in FIG. 1.

Referring now to FIGS. 6 and 7, tower 28 has a roller arm assembly 84 and a horizontal roller assembly 86 mounted thereto. Roller arm assembly 84 includes a cylinder 88 mounted at the distal end of a pivotal arm 89. The proximal end of arm 89 is pivotally connected to a mounting bracket 91 extending laterally from tower 28 as shown. Cylinder 88 includes a piston rod to which a roller head 90 is attached. Cylinder 88 may be pneumatically powered so as to aid the operator in pressing down upon a tire's sidewall. A hinged connection between tower 28 and roller arm assembly 84 enables the operator to position roller head 90 at a desired position about the tire's sidewall.

Roller head 90 includes a tapered roller system supported in the middle thereof by a bracket such that the roller is slightly offset from shaft 85. The taper of the rollers and the slight offset assists in keeping the roller snug onto the tire's sidewall. While FIG. 6 shows one type of roller arm, those of skill in the art will appreciate that different roller configurations are possible to achieve the task of depressing the tire's sidewall.

Referring specifically now to FIG. 7, horizontal roller assembly 86 will be described in more detail. Assembly 86 includes a dog-leg roller 92, actuating controls 94, a straight roller 96, and locking mechanisms 98 and 100. A bar 93 attached to dog-leg roller 92 extends into a receiver 102 fixed to a frame 104. Dog-leg roller 92 is so-called because its rotational axis is laterally offset from the axis of elongate bar 93. Similarly, a bar 95 attached to straight roller 96 extends into a receiver 106 fixed to frame 104. As shown by arrow 108, dog-leg roller 92 and bar 93 may be removed from shaft 102, turned over and reinserted to adjust the position of the roller relative to the mount/demount head. Frame 104, to which the rollers are mounted, may be vertically adjusted by the operator using controls 94. A pneumatic cylinder assembly 109 mounted to the side of frame 104 is actuated by controls 94 to raise and lower the rollers. An additional receiver 110 (with locking mechanism 111) may also be located on frame 104, as shown. Either dog leg roller 92 or straight roller 96 may be used with receiver 110 as desired.

As will be discussed below in relation to the machine's operation, the adjustability of dog-leg roller 92 enables horizontal roller assembly 86 to accommodate smaller and larger diameter tire-rim assemblies. In the embodiment shown in the Figures, rims of about 17 inches and below work well with the dog-leg roller turned away from the mount/demount head, and rims of more than about 18 inches in diameter work well with the dog-leg roller turned toward (closer to) the mount/demount head. Locking mechanisms 98, 100 and 111 enable the operator to prevent dog-leg roller 92 and straight roller 96 from moving axially relative to receivers 102, 106 and 110.

Referring now to FIG. 8, the interior of chassis 14 is shown. A pneumatic motor 112 and transmission 114 are located within chassis 14. Various other air lines, fittings, and controls are also found within chassis 14. A belt 116 between engine pulley 118 and transmission pulley 120 connects engine 112 to transmission 114. Transmission 114 may be positioned in the bottom of chassis 14 to allow for various clamping systems. One possible clamping system is a conventional rim engaging system as shown in the Figures. Another type of rim clamping system could be a center post system (not shown), or another type of clamping system. Having the transmission near the bottom of the chassis allows for design flexibility in the clamping system.

In addition, placing the transmission near the bottom of the chassis also reduces the overhung load on the transmission's bearings. Larger diameter tire-rim assemblies common on late model vehicles have greater weights and larger portions of the tire-rim weight are farther from the center of support. This weight distribution and greater weight creates greater loads on the transmission bearings. Reducing this load may increase the life of the transmission bearings.

Although one preferred mode of operation of tire changing machine 12 will now be described, one skilled in the art will appreciate that the various implements of machine 12 can be used in other ways depending on the situation. In addition, one or more steps may be omitted in some circumstances. Generally, tires are mounted to rims either from the front side or the back side. The present discussion will discuss removing a tire from the back side, although removing and mounting a tire from the front side is similar. By back side, it is meant that the rim is laid outer face down onto turntable 18.

The first step in removing a tire from a rim is to loosen the tire's bead from the rim's safety hump. To do this, bead loosening assembly 22 is employed. Blade 44 of bead loosening assembly 22 is pneumatically-operated, as discussed above. To loosen the bead, the tire-rim assembly is moved into position between blade 44 and pad 56. The bead near the outer face of the rim, or short side, preferably is loosened first. Blade 44 is moved into position near the sidewall of the tire at the rim/tire interface. The operator then pushes valve 51 toward chassis 14 to pneumatically move blade 44 against the tire. Preferably, blade 44 is pneumatically actuated until the bead is pushed just past the safety hump. This procedure may be repeated about the rim at several other locations as to completely loosen the bead from the rim.

Next, the tire-rim assembly must be positioned on turntable 18. This is accomplished by first lifting the tire-rim assembly to the level of chassis top 16 with the use of lift mechanism 20. The tire-rim assembly is rolled onto the lift mechanism's bar 58. Depressing pedal 34 causes bar 58 to move upward, thus raising the tire-rim assembly up to the level of turntable 18. The operator preferably steadies the tire-rim assembly on bar 58 during lifting.

Depressing and lifting pedal 38 causes the turntable's clamps 32 to move in and out radially. The operator should attempt to approximate the diameter of the rim with the spacing of clamps 32 prior to placing the rim onto clamps 32. With the tire-rim assembly raised to the same level as turntable 18, the operator now places the tire-rim assembly onto one of clamps 32, with the clamp resting at the interface of the tire and rim. Next, the operator maneuvers the tire-rim assembly onto the remaining clamps. Lift mechanism 20 may be lowered at this point by depressing pedal 34 again.

The tire-rim assembly is now upon the clamps, but the clamps have not engaged the rim. To engage the rim, the operator positions the clamps so that they align with the tire-rim interface about the rim. Helper arm assembly 24 may be positioned such that the contact block exerts a force upon the rim's hub. Force is applied to the rim through contact block 66 while the clamps are moved radially inward such that the rim seats into the clamps and the tire-rim assembly is secured to turntable 18.

With the rim secured to turntable 18, the next step is to remove the tire. To do this, horizontal roller assembly 86 is positioned relative to the tire. Depending on whether a larger diameter or smaller diameter rim/tire assembly is being worked upon, the orientation of dog leg roller 92 may change. For larger rims, dog leg roller 92 may be positioned as shown in solid lines in FIG. 7. For smaller diameter rims, dog leg roller 92 may be positioned as shown by the phantom lines in FIG. 7. The alternate positions of dog leg roller 92 help to equalize the distance between the roller and the mount/demount head during removal of the tire.

Dog leg roller 92 is positioned both horizontally (radially) and vertically to press the tire into the rim's drop center. Once the desired radial position of the dog leg roller is obtained, the roller is locked into position with locking mechanism 100. Frame 104 is then lowered such that the tire bead is pressed into drop center. Next, the rim is rotated approximately 90°, loosening the bead into the drop center of the rim. At this point, lubricant may be applied to the rim-bead interface. Preferably, a lubricant container 122 and a lubricant applicator 124 are conveniently positioned at the base of tower 28 (FIG. 1).

At this point in the demounting process, mount/demount assembly 26 is tilted forward and into a position close to the rim. Fine tuning of the mount/demount head's position is accomplished by using the buttons on controller 82. Once the desired position of mount/demount head 72 is achieved, the position is locked in by fully depressing a button on controller 82. To move the top bead above the rim, a lift tool in the form of an elongate pry bar is first used to pry the bead upon the mount/demount head. Before attempting this task, generous amounts of lubricant may be applied to both the mount/demount head and the lift tool. Horizontal roller assembly 86 can now be moved up and out of contact with the tire.

The lift tool is inserted between the tire bead and the mount/demount head and the operator pivots the lift tool against the mount/demount head such that the bead is lifted onto the head. At this point, the helper arm assembly's contact block 66 is preferably brought into contact with the tire sidewall at a position approximately 90° counterclockwise from mount/demount head 72. Contact block 66 is lowered so as to push the tire bead into the drop center. On the opposite side of the rim from contact block 66, roller arm assembly 84 may be brought into contact with the tire sidewall as well. In addition, roller head 90 may be positioned such that the tire sidewall is pressed into the drop center at a position near the front of the machine. Once the tire bead is lifted onto mount/demount head 72, contact block 66 and roller head 90 may be moved out of engagement and out of the way. The tire-rim assembly may now be slowly rotated in a clockwise direction and mount/demount head 72 will guide the tire bead above the rim's outer flange.

With the top bead removed, the lower bead may be removed as well. First, contact block 66 of helper arm assembly 24 is positioned under the upper bead of the tire. Second, contact block 66 is raised to pull the lower bead of the tire into the drop center position. Holding the tire up on one side with contact block 66, the operator then engages the opposite side of the tire with dog leg roller 92 from below. Next, dog leg roller 92 is raised such that the lower bead of the tire is raised above the upper flange of the rim. Contact block 66 is then moved out of engagement with the tire and out of the way. Rotation of the rim will enable dog leg roller 92 to fully remove the tire from the rim. Once the tire is removed from the rim, it may be pushed onto lift mechanism 20 and removed from the machine.

The tire mounting procedure will now be described. A tire is rolled onto lift mechanism 20, which is then raised such that the tire is brought to the level of a rim which is secured to turntable 18. The operator pushes the tire onto the rim such that the lower bead of the tire rests against the upper flange of the rim. At this point, ample amounts of lubricant preferably are applied to both beads of the tire and both flanges of the rim. Next, mount/demount head 72 is tilted forward and into position against the upper flange of the rim. Rotation of the rim at this point will guide the lower bead of the tire into the drop center.

Horizontal roller assembly 86 is then moved into position such that dog leg roller 92 presses the top bead of the tire into the drop center. Finger roller 73 may now be affixed to mount/demount head 72 such that finger roller 73 comes into contact with the tire bead and helps to position the tire bead relative to mount/demount head 72. Contact block 66 of helper arm assembly 24 is then positioned approximately 90° ahead of, clockwise from, mount/demount head 72.

Contact block 66 is lowered such that it presses the tire's top bead into the drop center of the rim. As the rim is rotated, contact block 66 rotates with the tire keeping the upper bead in the drop center location (frequently described as maintaining bead lock). If the upper bead of the tire appears to be moving out of the drop center of the rim at any point during mounting of the tire, roller arm assembly 84 may be moved into position between head 72 and contact block 66 to prevent the bead from moving out of the drop center position. Continued rotation of the rim allows mount/demount head 72 to press the upper tire bead below the rim flange and into the drop center while dog leg roller 92 and helper arm assembly 24 maintain the top bead in the drop center position. After a complete rotation, the top bead will be completely below the rim flange. Once the upper bead is completely mounted, all of the assemblies, including the mount/demount head, helper arm assembly, roller arm assembly, and finger roller, may be moved out of the way or retracted. Inflation of the tire and removal of the tire-rim assembly from the machine using lift mechanism 20 complete the process.

Figure 12:
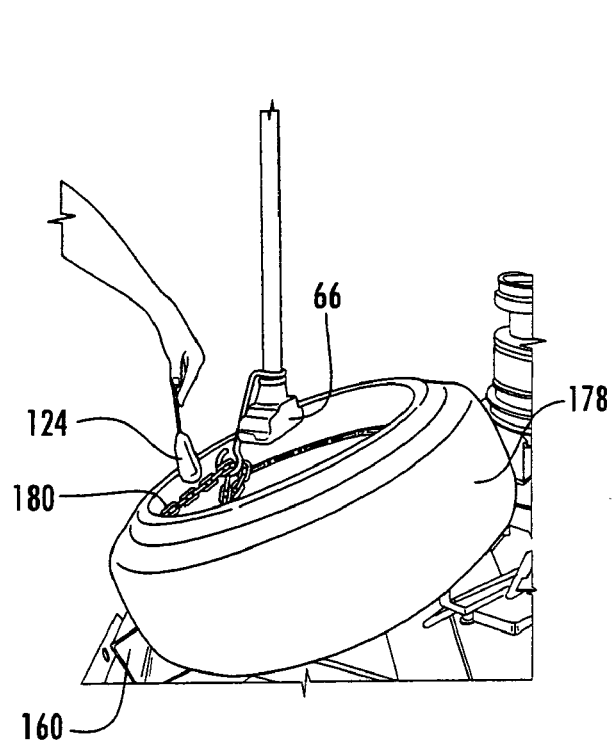
FIGS. 12 through 15 illustrate steps in the removal of a support member of a Pax-style tire according to exemplary methodology of the present invention.
Figure 13:
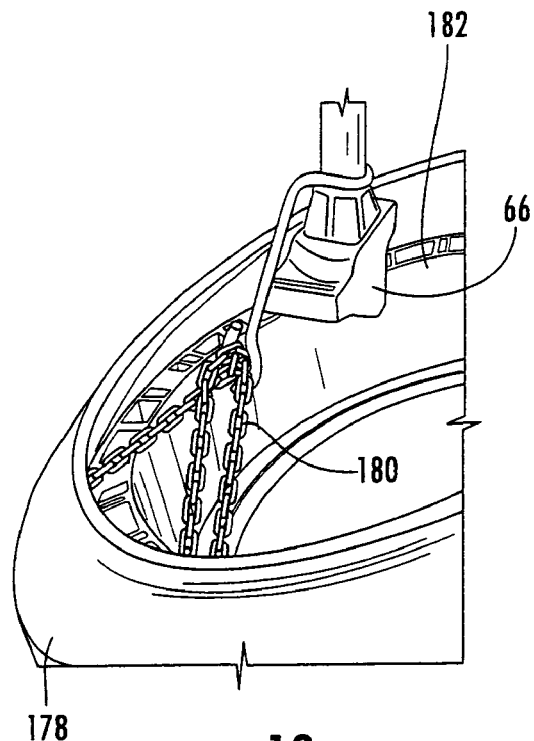

One preferred manner of using the machine in order to remove and install a support member inside a Pax-style tire 178 will now be described with reference to FIGS. 12-19. Referring first to FIGS. 12 and 13, the operator rotates the tabletop 30 until a scallop (i.e., the region between radial protrusions) is toward the machine's lift mechanism 150. Bracket 160 is installed into the appropriate pair of slotted holes on the lift arm 152. The tire is then placed with the large side diameter up, after which the operator raises lift arm 152 to wedge the tire between tabletop 30 and bracket 160. A chain 180 (illustrated), strap or other suitable tether extending around support member 182 is then connected to the shaft carrying contact block 66. Rubber lubricant is then preferably applied to the top bead of the tire.

Figure 14:
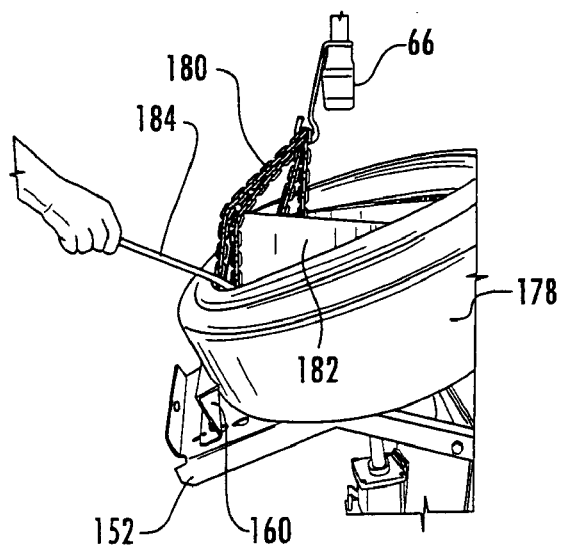
Figure 15:
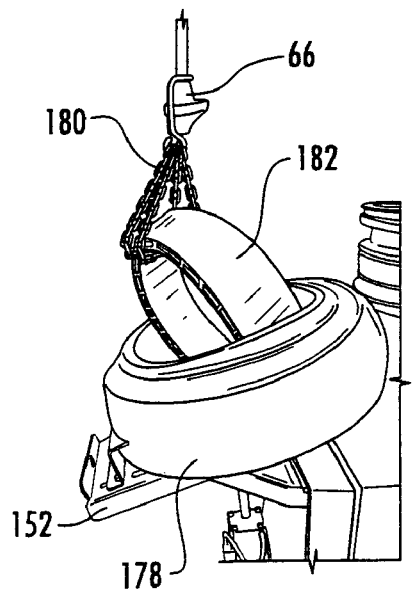

As shown in FIG. 14, a lift tool 184 is the inserted between support member 182 and tire 178 to guide support member 182 out of the tire as contact block 66 (and thus the tether attached to the support member) are brought upward. Next, as shown in FIG. 15, support member 182 can be completely removed from the tire by forcing to the side. With narrow support members, the support member can be removed by using the lift tool to pick the support member out of the tire.

Figure 16:
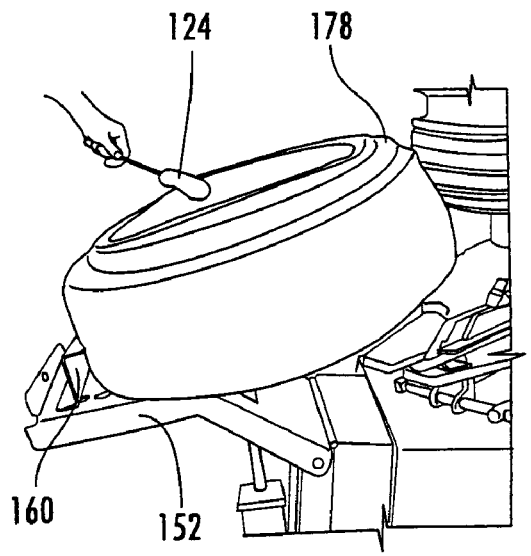
FIGS. 16 through 19 illustrate steps in the installation of a support member of a Pax-style tire according to exemplary methodology of the present invention.
Figure 17:
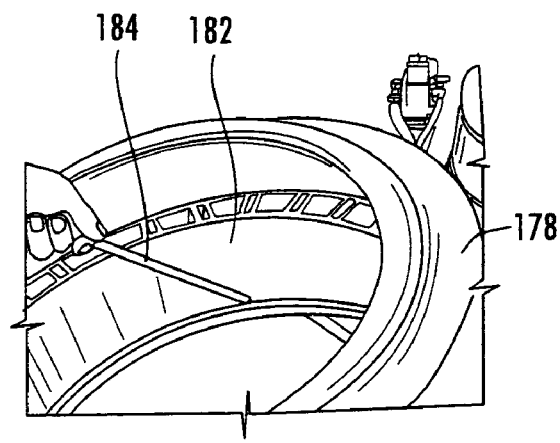

Referring now to FIGS. 16 through 17, a process of installing support member 182 will be described. To start the support installation, the tire is positioned with the large diameter bead up and wedged between tabletop 30 and bracket 160 on lift arm 152 (FIG. 16). The tire bead edges are then lubricated and the operator begins to force support member 182 into tire 178. The operator uses hands to pull the tire sidewall up.

Figure 18:
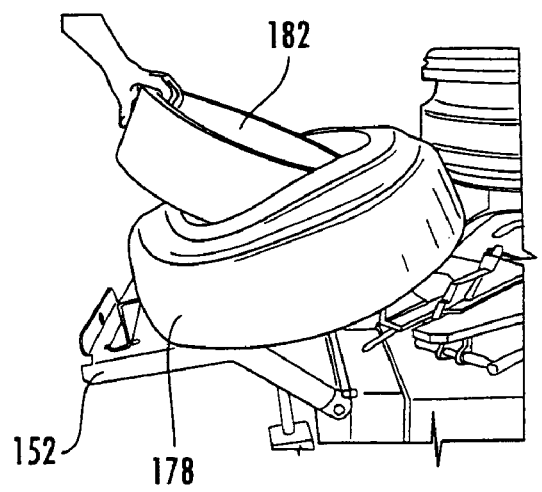
Figure 19:
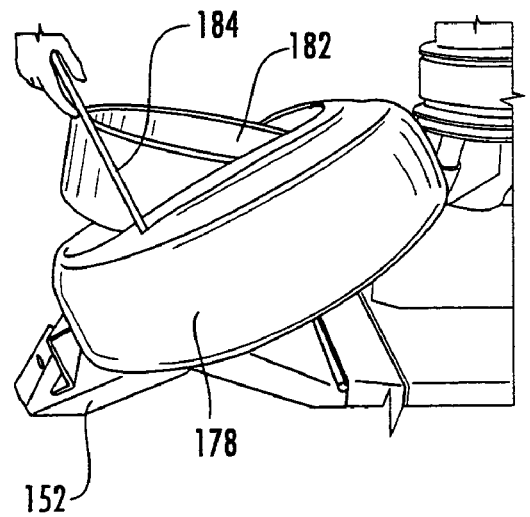

Before flipping support member 182 inside the tire, it is inspected to make sure the clips on the support member will match the groove on the wheel once the tire is installed on the rim. (The clips on the support member are being pointed out in FIG. 17.) As shown in FIG. 18, once support member 182 is inside the tire and flipped, the lower side of support member 182 is grasped and pulled up to the lower bead of tire 178. Lift tool 184 is then used to wedge support member 182 completely into the tire, as shown in FIG. 19. Typically, this is accomplished by starting at one side, then moving to the other side and wedging that side. This wedging process is continued back and forth with the lift tool until the support member is completely inside the tire.

Those of skill in the art will appreciate the novel layout of machine 12. The tools, including helper arm assembly 24, mount/demount assembly 26, horizontal roller assembly 86, lift mechanism 20, and roller arm assembly 84, along with pedals 36, are arranged in a manner that enables the operator to easily reach the tools and use them on a tire-rim assembly. For example, in FIG. 1, the base of helper arm assembly 24, mount/demount assembly 26 and the tower to which roller arm assembly 84 and horizontal roller assembly 86 are attached are all oriented at one end of chassis 14. Due to their orientation at one end of chassis 14, along with the diagonal location of pedals 36 from mount/demount assembly 26, the operator may more easily reach and operate the various tools. Generally, only one operator is required to remove or install a tire regardless of tire size or difficulty.

Figure 20:
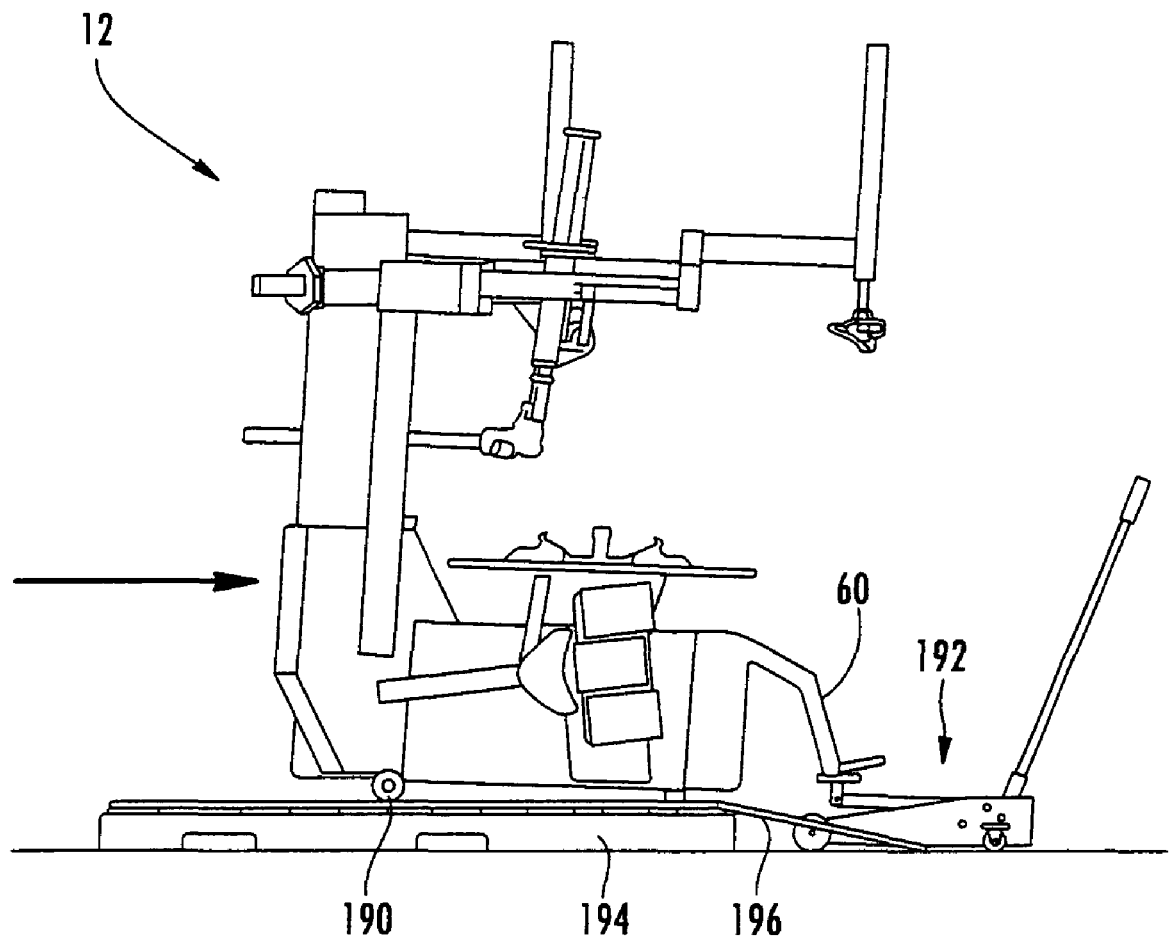
FIG. 20 illustrates removal of a tire changer in accordance with the present invention from a shipping pallet.

Referring now to FIG. 20, tire changing machine 12 is configured in a manner to facilitate movement of the machine after being shipped to its final destination. Typically, tire changing machines are loaded onto a pallet for shipping. Removal of the machine from the pallet after arrival at the final destination has often been difficult in the past.

In order to overcome the difficulties of the prior art, machine 12 is equipped with a pair of temporary casters 190. In this case, casters 190 are located near the rear of machine 12 as shown. A conventional jack 192 is placed under lift arm 60 and is used to raise the front of machine 12. Jack 192 is then pulled by its handle to roll machine 12 off pallet 194, down ramp 196 and to the desired final location. The jack can then be used to temporarily raise the back of machine 12 while casters 190 are removed.

While one or more preferred embodiments of the invention have been described above, it should be understood that any and all equivalent realizations of the present invention are included within the scope and spirit thereof. The embodiments depicted are presented by way of example and are not intended as limitations upon the present invention. Thus, those of ordinary skill in this art should understand that the present invention is not limited to these embodiments since modifications can be made. Moreover, tire changing machines in accordance with the present invention may include some, most or all of the various implements and features described herein. It is further contemplated that various features described herein may be adapted to retrofit existing tire changing machines and are thus fully patentable in their own right. Therefore, it is contemplated that any and all such embodiments are included in the present invention as may fall within the scope and spirit thereof.

What is claimed is:

1. A tire changing machine comprising:
   a chassis having a polygonal structure defining a back, front and first and second lateral sides, said first lateral side and said back side defining a first corner location and said second lateral side and said back side defining a second corner location;
   a rotatable turntable configured to retain a wheel rim;
   a tiltable tower at said second corner location and carrying a mount/demount head movable toward and away from the wheel rim in a plane angularly offset from a back-to-front axis of said chassis extending transverse to a rotational axis of said turntable;

a fixed support tower at said first corner location, said support tower carrying at least one roller assembly;

a plurality of pedal actuators located on said first lateral side of said chassis, said actuators being operative to control operation of at least said turntable; and, wherein the tiltable tower tilts toward the turntable from a position generally diagonally across the chassis from said pedal actuators.

2. A tire changing machine as set forth in claim 1, further comprising a helper arm assembly located adjacent said back side of said chassis.

3. A tire changing machine as set forth in claim 2, wherein said helper arm assembly includes a pivotal helper arm having a fluid actuated cylinder at a distal end thereof.

4. A tire changing machine as set forth in claim 3, wherein said fluid actuated cylinder carries a contact block for engaging a sidewall of a vehicle tire.

5. A tire changing machine as set forth in claim 4, wherein said pivotal helper arm comprises first and second arm segments articulated at an intermediate pivot point.

6. A tire changing machine as set forth in claim 1, wherein said rotatable turntable has a plurality of radially movable clamps operative to engage said wheel rim.

7. A tire changing machine as set forth in claim 1, wherein said at least one roller assembly carried by said support tower comprises a roller arm assembly.

8. A tire changing machine as set forth in claim 7, wherein said roller arm assembly includes a pivotal arm having a fluid actuated cylinder located at a distal end thereof, said fluid actuated cylinder carrying a roller head for engaging a sidewall of a vehicle tire.

9. A tire changing machine as set forth in claim 8, wherein said roller head comprises first and second rollers each having a tapered roller surface.

10. A tire changing machine as set forth in claim 1, further comprising a finger roller attached at a fixed location adjacent to said mount/demount head to facilitate tire mounting.

11. A tire changing machine as set forth in claim 10, wherein said finger roller is removable when not in use.

12. A tire changing machine as set forth in claim 1, further comprising a bead loosening assembly located at said second lateral side of said chassis.

13. A tire changing machine as set forth in claim 12, wherein said bead loosening assembly utilizes a three-position valve.

14. A tire changing machine comprising:

a chassis having a polygonal structure defining a back, front and first and second lateral sides, said first lateral side and said back side defining a first corner location and said second lateral side and said back side defining a second corner location;

a rotatable turntable configured to retain a wheel rim;

a tiltable tower at said second corner location and carrying a mount/demount head movable toward and away from the wheel rim;

a plurality of pedal actuators located on said first lateral side of said chassis, said actuators being operative to control operation of at least said turntable;

a tire lift mechanism mounted adjacent to said chassis, said tire lift mechanism including a lift arm that pivots away from said chassis to raise a tire to a higher level;

a horizontal roller assembly having at least one roller, the horizontal roller assembly being located adjacent said back side of said chassis at said first corner location on a fixed support;

a helper arm assembly located adjacent said back side of said chassis, said helper arm assembly having a contact block for engaging a sidewall of a vehicle tire as the tire is rotated using the turntable;

a roller arm assembly located adjacent said back side of said chassis on said fixed support, said roller arm assembly including a pivotal arm having a fluid actuated cylinder located at a distal end thereof, said fluid actuated cylinder carrying a roller head for engaging a sidewall of a vehicle tire; and a bead loosening assembly located at said second lateral side of said chassis.

* * * * *